United States Patent [19]

Taira et al.

[11] Patent Number: 5,704,968
[45] Date of Patent: Jan. 6, 1998

[54] STAMP INK AND STAMP INK IMPREGNATION PAD FOR STENCIL PRINTING

[75] Inventors: Hiroshi Taira, Ichinomiya; Minoru Yamamoto, Yokkaichi; Hiroshi Takami, Nagoya; Takahiro Yuasa, Yachiyo; Hideki Hasegawa, Funabashi, all of Japan

[73] Assignee: Brother Kogyo Kabushiki Kaisha, Aichi-ken, Japan

[21] Appl. No.: 593,050

[22] Filed: Jan. 29, 1996

[30] Foreign Application Priority Data

Jan. 31, 1995 [JP] Japan ................................. 7-34379

[51] Int. Cl.$^6$ ................................. C09D 11/06; C09D 11/08
[52] U.S. Cl. ................ 106/31.34; 106/31.4; 106/31.41; 106/31.66; 106/31.72; 106/37.73; 106/32
[58] Field of Search ................. 106/20 R, 27 R, 106/29 R, 27 A, 30 R, 32, 31.34, 31.4, 31.41, 31.66, 31.72, 31.73

[56] References Cited

U.S. PATENT DOCUMENTS

| | | | |
|---|---|---|---|
| 5,378,739 | 1/1995 | Koike et al. | 106/30 R |
| 5,395,435 | 3/1995 | Mizobuchi | 106/27 T |
| 5,483,880 | 1/1996 | Seo et al. | 101/125 |
| 5,573,578 | 11/1996 | Okuda | 106/27 R |
| 5,575,839 | 11/1996 | Okuda | 106/27 R |

FOREIGN PATENT DOCUMENTS

| | | |
|---|---|---|
| A-0 285 359 | 10/1988 | European Pat. Off. |
| 38 08 699 A1 | 9/1989 | Germany |
| A-63 277 287 | 11/1988 | Japan |
| A-06 049 401 | 2/1994 | Japan |
| WO-A-86 01527 | 3/1986 | WIPO |

Primary Examiner—Helene Klemanski
Attorney, Agent, or Firm—Oliff & Berridge

[57] ABSTRACT

A stamp ink, for stencil printing, is made from a coloring-agent mixed in a vehicle made from resin and oil-based solvent. The stamp ink has a viscosity in a range from 20 to 250 poises at a shear rate of 20/sec under temperature of 25° C. and has a thixotropy index T.I. in a range from 1.2 to 3.0 under temperature of 25° C. where the thixotropy index T.I. is defined in the expression of: T.I.=(Viscosity at a shear rate of 0.5/sec)/(Viscosity at a shear rate of 5.0/sec).

15 Claims, 1 Drawing Sheet

STAMP INK AND STAMP INK IMPREGNATION PAD FOR STENCIL PRINTING

BACKGROUND OF THE INVENTION

1. Field of the Invention

The present invention relates to a stamp ink and a stamp ink impregnation pad impregnated with the stamp ink for stencil printing.

2. Description of the Related Art

Stamp inks are generally impregnated in a porous ink pad which is made of paper, cloth, resin sponge, or other materials. When a user presses a rubber stamp against the surface of the ink pad, the ink pad can supply the stamp with the ink. The user presses the stamp onto a paper to imprint the stamp image with the ink.

Stamp inks are used also in a stamp of an integrated-type. The integrated-type stamp has a porous-rubber member having numerous minute continuous pores. The porous-rubber member is formed with a raised portion representative of a stamp image. The porous-rubber member is impregnated with stamp inks. By simply pressing the stamp against a paper, stamp inks ooze out of the porous-rubber member from its raised portion to imprint the stamp image on the paper.

These stamp inks are generally made of dye, water-based resin, or glycol solvents, have a low viscosity, and exhibit a fluidity approximating Newtonian fluids. Accordingly, when printing continuously, the stamp ink will easily move and replenish the surface portion of the ink pad or of the porous-rubber member. The stamp ink will spread through the paper to speed the drying of the paper surface after printing.

The diameter of the pores in the ink pad and in the porous-rubber member are made to be considerably minute. Accordingly, when pressure is applied to the ink pad and to the porous-rubber member, a large quantity of the stamp ink will not ooze out in excess at one time. The minute pores also promote the capillary action in the ink pad and in the porous-rubber member. The stamp ink will therefore immediately move and replenish the surface portion of the ink pad and of the porous-rubber member.

SUMMARY OF THE INVENTION

U.S. Pat. No. 5,483,880 and U.S. patent application Ser. No. 08/396,720 have proposed a stamp unit of a stencil-printing type. The stencil-printing type stamp unit is made from a combination of: an impregnation pad impregnated with stamp ink; and a stencil paper fixedly covering the surface of the impregnation pad. The stencil paper is made from a thermoplastic film. The stencil paper is thermally perforated in dots with a thermal head. By pressing the impregnation pad against a paper via the stencil paper, stamp inks seep out through the perforations to imprint an image.

However, because the diameter of the perforations formed in the stencil paper are somewhat large, from 30 μm to 100 μm, the stencil-printing type stamp unit fails to provide satisfactory prints when impregnated with the above-described conventional stamp inks. That is, because the stamp inks have the low viscosity and have fluidity approximating Newtonian fluids, a large amount of ink is transferred during printing to be blurred on the print surface. The ink is slow to set or is slow to be dried on the surface of the paper. If rubbed, the ink will smudge the print and will stain the user's hands. With the passage of time, the stamp ink will drip down from the perforated portion of the stencil paper, staining the stamp and the paper.

When the pad is leaned against something for a period of time, the stamp ink in the pad displaces to collect at the lower section through the force of gravity, so that there is no stamp ink at the upper section of the pad. If stamping is achieved in this condition, the stamp ink does not adhere to the paper and makes a faint imprint on the paper. A satisfactory print is unable to be obtained. This tendency is noticeable particularly in the summer when the viscosity of the stamp ink drops considerably due to the high temperature.

An object of the present invention is therefore to solve the above-described problems and to provide a stamp ink and a stamp ink impregnation pad in a stencil printing type stamp unit, in which the stamp ink does not displace to collect in a lower portion of the pad due to the gravitational force, forms a sharp print with no blurring, and sets quickly, making possible the production of prints with a high print density and permitting even longer continuous printing.

In order to attain the above and other objects, the present invention provides the viscosity characteristics of the ink and the density of the pad that can allow the stamp ink not to displace in the pad due to the gravitational force, to form sharp prints with no blurring, to set quickly, to produce prints with a high print density, and to perform longer continuous printing.

The present invention therefore provides a stamp ink for stencil printing, the stamp ink including a coloring-agent mixed in a vehicle made from resin and oil-based solvent, the stamp ink having a viscosity in a range from 20 to 250 poises at a shear rate of 20/sec, the stamp ink having a thixotropy index T.I. in a range from 1.2 to 3.0 where the thixotropy index T.I. is defined in the expression of: T.I.= (Viscosity at a shear rate of 0.5/sec)/(Viscosity at a shear rate of 5.0/sec).

Preferably, the stamp ink has a viscosity in the range from 20 to 250 poises at a shear rate of 20/sec at temperature of 25° C., and has a thixotropy index T.I. in the range from 1.2 to 3.0 at temperature of 25° C.

The stamp ink is preferably made from the coloring-agent, the resin, and the oil-based solvent with their amounts allowing the stamp ink to develop the viscosity in the range from 20 to 250 poises at the shear rate of 20/sec at 25° C. and to develop the thixotropy index T.I. in the range from 1.2 to 3.0 at 25° C. The stamp ink may be preferably made through adding the coloring-agent to the resin and the oil-based solvents, breaking down and dispersing the mixture, and then adding to the mixture amounts of the resin and the oil-based solvents that allow the stamp ink to develop the viscosity in the range from 20 to 250 poises at the shear rate of 20/sec at 25° C. and to develop the thixotropy index T.I. in the range from 1.2 to 3.0 at 25° C.

The stamp ink may be made from the coloring-agent, the resin, the oil-based solvent, and thixotropic agents with the amounts of the thixotropic agents allowing the stamp ink to develop the viscosity in the range from 20 to 250 poises at the shear rate of 20/sec at 25° C. and to develop the thixotropy index T.I. in the range from 1.2 to 3.0 at 25° C.

According to another aspect, the present invention provides a stamp ink impregnation pad for supplying a stamp ink to a stencil paper, the stamp ink impregnation pad including a porous impregnation pad formed with continuous pores to be impregnated with stamp ink, the porous impregnation pad having a density in a range from 20 kg/m³ to 300 kg/m³.

According to a further aspect, the present invention provides a stamp ink impregnation pad for supplying a stamp ink to a stencil paper, the stamp ink impregnation pad comprising: a porous impregnation pad formed with continuous pores to have a density in a range from 20 kg/m³ to 300 kg/m³; and a stamp ink impregnated in the porous impregnation pad, the stamp ink including a coloring-agent mixed in a vehicle made from resin and oil-based solvent, the stamp ink having a viscosity in a range from 20 to 250 poises, at a shear rate of 20/sec, and having a thixotropy index T.I. in a range from 1.2 to 3.0 where the thixotropy index T.I. is defined in the expression:

T.I.=(Viscosity at a shear rate of 0.5/sec)/(Viscosity at a shear rate of 5.0/sec).

According to still another aspect, the present invention provides a stamp unit for stencil printing an ink image, the stamp unit comprising: a porous impregnation pad impregnated with a stamp ink, the porous impregnation pad having continuous pores with a density in a range from 20 kg/m³ to 300 kg/m³, the porous impregnation pad being impregnated with stamp ink, the stamp ink including a coloring-agent mixed in a vehicle made from resin and oil-based solvent, the stamp ink having a viscosity in a range from 20 to 250 poises, at a shear rate of 20/sec, and having a thixotropy index T.I. in a range from 1.2 to 3.0 where the thixotropy index T.I. is defined in the expression of T.I.=(Viscosity at a shear rate of 0.5/sec)/(Viscosity at a shear rate of 5.0/sec); a stencil paper attached to the porous impregnation pad and formed with a perforation image to allow the stamp ink to seep out therethrough; and a holding member for holding the porous impregnation pad and the stencil paper in contact with each other.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
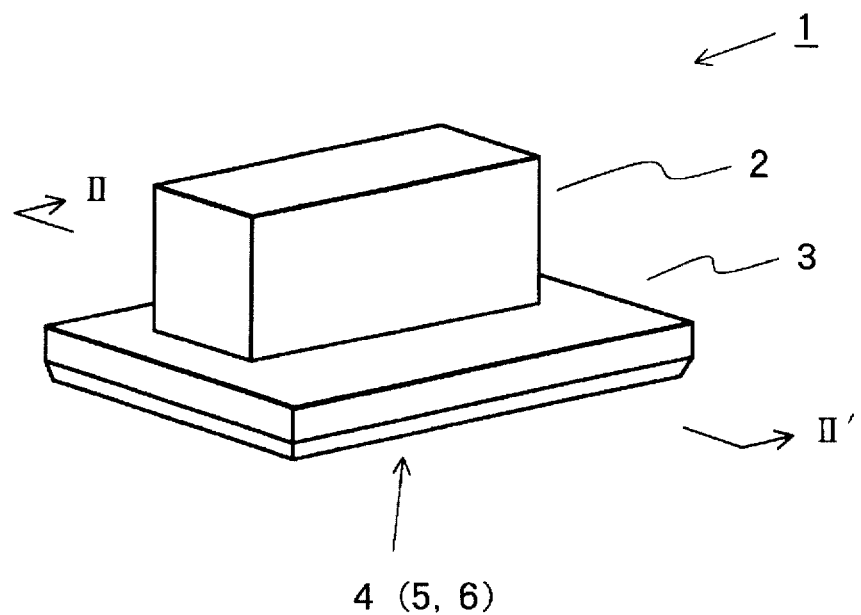
FIG. 1 is a perspective view of a stamp unit of a preferred embodiment of the present invention.

A stamp unit according to a preferred embodiment of the present invention will be described while referring to the accompanying drawings wherein like parts and components are designated by the same reference numerals.

Figure 2:
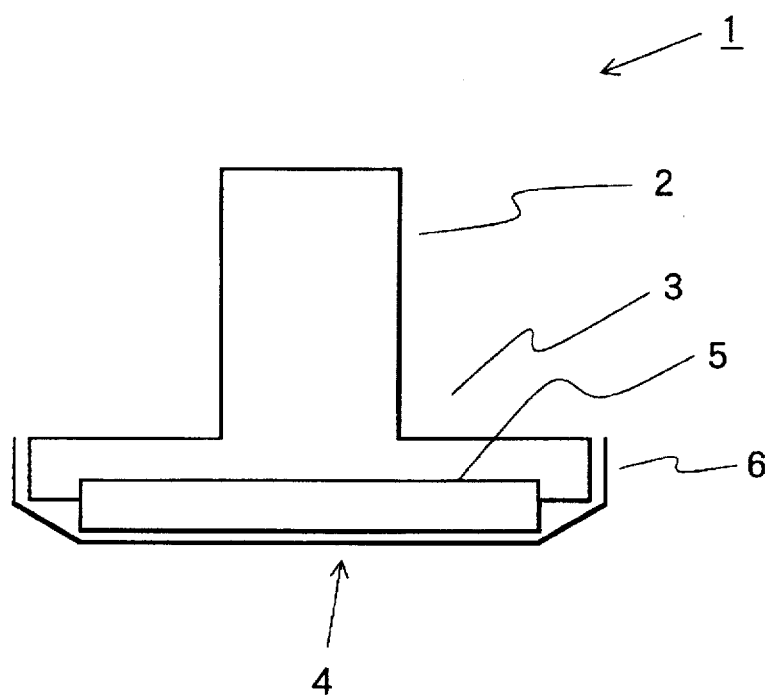
FIG. 2 is a cross-sectional view of the stamp unit of FIG. 1 taken along a line II-II'.

FIG. 1 shows an external view of the stamp unit for stencil printing according to the present embodiment. FIG. 2 shows a cross-sectional view of the stamp unit.

The stamp unit 1 includes a grip portion 2, a print face holding portion 3, and a print face portion 4. The print face portion 4 is constructed from a pad 5 impregnated with a stamp ink to be described later and covered with a heat-sensitive stencil paper 6. The pad 5 is attached to the bottom surface of the print face holding portion 3. The stencil paper 6 is attached at its ends to the sides of the print face holding portion 3 so as to cover the pad 5. Though the stencil paper 6 is in contact with both the pad 5 and the print face holding portion 3, the stencil paper 6 is illustrated separately in FIG. 2 for ease of understanding.

The pad 5 is formed with numerous small continuous pores. Any of paper, cloth, rubber, resin sponge or other materials are suitable for the pad 5. From the point of view of cost and processing, a resin sponge, and in particular, polyurethane foam is preferred as the pad 5.

The stencil paper 6 is constructed from a thermoplastic film attached to a porous carrier via an adhesive layer. The thermoplastic film is made of a thermoplastic synthetic resin film (for example, polyethylene terephthalate, polypropylene, vinylidene chloride-vinyl chloride copolymer) with a thickness of 1 to 4 μm, preferably 2 μm. The porous carrier is made of a thin sheet of porous paper made primarily of: a natural fiber such as Manila hemp, paper mulberry (Broussonetia kazinoki), and mitsumata (Edgeworthia papyrifera); a synthetic fiber such as polyethylene terephthalate, polyvinyl alcohol, and polyacrylonitrile; or a semi-synthetic fiber such as rayon.

The stamp unit 1 is formed with a desired stamp image by a thermal head. That is, the stencil paper 6 provided to the stamp unit 1 is thermally perforated in dots by the thermal head so that a perforated dot image is formed on the stencil paper. For example, the stamp unit 1 is mounted to and perforated by a thermal perforating device. The thermal perforating device includes: a perforation mount portion in which the stamp unit 1 is detachably mounted; a thermal head for perforating the stencil paper 6; a keyboard for inputting characters; and a control unit for controlling the thermal head to perforate the inputted character array in the stencil paper.

The thermal head is similar to that employed in a thermal printer. The thermal head is provided with, for example, ninety-six heating elements aligned in a row. The thermal head is mounted on a carriage. The control unit selectively drives the heating elements while driving the carriage to transport the thermal head along and in contact with the print face portion 4 of the stamp unit 1. Accordingly, the inputted character array is perforated on the stencil paper 6 of the stamp unit 1. By holding the grip portion 2 in the hand and pressing the stamp unit 1 on a paper or other printing surface, the pad 5 is compressed and stamp ink seeps out through the perforated portion of the stencil paper 6, making a print of the character array.

For example, the stamp unit 1 can be constructed and perforated as described in the U.S. Pat. No. 5,483,880 and the U.S. patent application Ser. No. 08/396,720, the disclosures of which are hereby incorporated by reference.

It is noted that the stencil paper 6 can be perforated before being attached to the print face holding portion 3 of the stamp unit 1.

The stamp ink, impregnated in the pad 5, is made of a coloring agent mixed in a vehicle formed from resin and an oil-based solvent. A thixotropic agent (or a plastic agent) can preferably be mixed in the stamp ink.

Examples of materials utilized as the coloring agent are: inorganic pigments such as carbon black, red iron oxide, ochre, ultramarine blue, and Prussian blue; organic pigments such as insoluble azo dye, soluble azo dye, phthalocyanine, and quinacridone, and oil-soluble dyes.

Examples of materials utilized as the resin are rosin, rosin ester, rosin-modified phenol resin, alkyd resin, petroleum resin, and rosin-modified maleic resin.

Materials with a low volatility are preferable as the oil-based solvent. Examples include: hydrocarbon solvents with a boiling point of 300° C. or higher; and petroleum solvents such as spindle oil, liquid paraffin, motor oil, gear oil, and machine oil. Further examples include synthetic oils obtained through the polymerization of unsaturated hydrocarbons such as ethylene, propylene, and butene. In addition, animal and vegetable oils such as castor oil, tall oil, soybean oil, olive oil, and whale oil can also be used.

To produce the stamp ink of the present invention from the above-listed materials, the coloring agent is first added to all or a portion of the resin and of the solvents. The mixture is then broken down and dispersed in a dispersion mill such as a triple roll mill or a sand mill. Next, the remaining resin and solvents are added to the mixture so as to adjust the viscosity characteristics into a range as described below so that the produced stamp ink will come out from the pad 5 to the proper degree and so that the stamping operation will be properly attained.

Thixotropic agents (or plastic agents) are added either during the preparation of the stamp ink or during the preparation of resin varnish. Examples include aluminum stearate, aluminum octylate, aluminum oleate, aluminum naphthenate, ethyl acetoacetate aluminum diisopropylate, alkyl acetoacetate aluminum diisopropylate, higher fatty acid amides, and extender pigments such as talc, kaolin, calcium carbonate, and barium sulfate. Further examples include silica gel and class four ammonium salts of montmorillonite. These thixotropic agents (or plastic agents) should preferably be added in the range of 1 to 5% of the weight of the resin.

According to the present invention, the stamp ink is prepared to have a viscosity in the range from 20 to 250 poises at a shear rate of 20/sec. The stamp ink is preferably prepared to have a viscosity in the range from 50 to 200 poises at the shear rate of 20/sec. More preferably, the stamp ink is prepared to have a viscosity in the range from 80 to 150 poises at the shear rate of 20/sec. If the viscosity is lower than the values given above, then during printing the stamp ink comes out in excess, blurring the print. This makes the ink slow to set, and if rubbed, smudges the print and stains the hands. If the viscosity is higher than the values given above, then during printing it is difficult for the stamp ink to come out, making the print image thin and faint. It becomes necessary to increase the stamping load applied to the stamp unit 1 against the paper when stamping. The stencil paper 6 therefore becomes likely to be wrinkled at the print face.

A thixotropy index T.I. is defined by the following expression:

T.I.=(Viscosity at a shear rate of 0.5/sec)/(Viscosity at a shear rate of 5.0/sec).

A fluid with a T.I. of 1.0 is a Newtonian fluid. As the T.I. increases, so does the thixotropy or plasticity of the fluid.

According to the present invention, the stamp ink is prepared to have a value of T.I. in the range from 1.2 to 3.0. Preferably, the stamp ink is prepared to have a value of T.I. in the range from 1.3 to 2.5. More preferably, the stamp ink is prepared to have a value of T.I. in the range from 1.4 to 2.0. If the T.I. value is lower than the values given above, then the stamp ink will displace to collect in a lower portion of the impregnation pad through the gravitational force. If the T.I. is higher than the values given above, then during printing it becomes difficult for the stamp ink to come out, making the print image thin and faint. It becomes necessary to increase the stamping load. The stencil paper 6 becomes likely to be wrinkled at the print face. Stamping durability suffers as a result.

It is noted that various additive agents can be added to the stamp ink as necessary so long as the effects of the present invention are not impaired. Examples of the additive agents include dispersants, abrasion resistance improvers, antioxidants, and antisetoff agents.

With only the above-described viscosity characteristics of the stamp ink, the stamp unit 1 can obtain sufficiently high stamping quality. However, the stamp unit 1 can obtain even higher quality when a pad density of the pad 5 is selected as described below. The pad density is defined as the mass of the material forming the pad 5 per unit volume. As the pad density increases, there is a tendency for the continuous pores in the pad to become smaller, making it more difficult for the stamp ink to come out. When the pad density decreases, there is a tendency for the continuous pores of the pad to become larger, making it easier for the stamp ink to come out.

The pad 5 of the present invention therefore has a pad density in the range from 20 kg/m$^3$ to 300 kg/m$^3$. Preferably, the pad 5 has a pad density in the range from 50 kg/m$^3$ to 200 kg/m$^3$. More preferably, the pad 5 has a pad density in the range from 80 kg/m$^3$ to 150 kg/m$^3$. If the pad density is lower than the values given above, during printing the stamp ink oozes out in excess, blurring the print. The ink is slow to set, and if rubbed, smudges the print and stains the hands. On the other hand, if the pad density is higher than the values given above, it is difficult for the stamp ink to come out. It becomes necessary to increase the stamping load. The stencil paper becomes likely to be wrinkled at the print face. This results in reduced stamping durability.

The viscosity and T.I. value of the stamp inks can be freely set to any desired values in the above-described ranges through changing the preparation manner, the kinds of materials, or the amounts of materials, especially, the amounts of the thixotropic agents (or plastic agents).

An example of the stamp ink and the pad 5 of the present invention will be described below. In the examples, "parts" refers to parts by weight.

(Varnish preparation example 1)

First, 55 parts of motor oil and 45 parts of alkyd resin were prepared in a four-opening flask with agitator, and stirred for 30 minutes under a nitrogen air current at 180° C. to dissolve the resin. Next, the mixture was cooled to 160° C., and 2.0 parts of aluminum stearate were added. The mixture was then stirred for one hour, producing resin varnish 1.

(Varnish preparation example 2)

Resin varnish 2 was produced through the same procedure as Varnish preparation example 1 except that the aluminum stearate was not added.

(Ink preparation example)

First, 13 parts of resin varnish 2, 7 parts of carbon black, 10 parts of motor oil were mixed and dispersed in a triple roll mill. Next, the mixture was further added with varnish 1 and varnish 2 and additional motor oil as appropriate and mixed with a disperser so that the viscosity, at a shear rate of 20/sec, ranged from 15 to 320 poise in seven steps and so that the T.I. ranged from 1.1 to 3.3 in five steps. In this way, a total of 35 individual stamp inks were obtained. The total amounts of the 35 individual stamp inks were 100 parts. During this step, the viscosity of the produced stamp inks was measured with a cone plate viscometer in a 25° C. thermostatic chamber. The viscosity, at 2 rpm (0.5/sec) and 20 rpm (5.0/sec), of the produced stamp inks was measured with a BH-type viscometer also in the 25° C. thermostatic chamber, and the T.I. of the stamp inks was calculated.

(Printing test)

Next, pads, made of urethane foam ("Urethane Color Foam CFS" produced by Inoac Corporation) with various pad densities in the range from 15 to 330 kg/m$^3$, were impregnated with the stamp inks obtained above. Printing tests were carried out to observe: sharpness of ink prints (i.e., the degree how ink prints are obtained without being blurred); quickness to set; a stamping load; stamping durability; and stamp ink displacement.

In a first test, pads with the same pad density of 120 kg/m³ were used. Inks having various values of T.I. and viscosity were impregnated in the pads. The results are shown in Table 1.

In a second test, inks having the same T.I. of 1.7 but having various values of viscosity were used. These inks were impregnated in pads with various values of pad density. The results are shown in Table 2.

In a third test, inks having the same viscosity of 120 poises but having various values of T.I. were used. These inks were impregnated in pads with various values of pad density. The results are shown in Table 3.

In each Table, the bold lines surround the items of the present invention.

The data in each of the boxes in each Table have the following meanings.

(1) Upper left—sharpness of print (i.e., the degree how the print is obtained without blurring) at temperature of 25° C.
Good: ○ (not blurred)
Fair: Δ (slightly blurred)
Poor: × (much blurred)

(2) Upper middle—quickness to set at temperature of 25° C.
Good: ○
Fair: Δ
Poor: ×

(3) Upper right—stamping durability at temperature of 25° C. (Unit: number of times)

The stamping durability was defined as the number of times where a satisfactory image was obtained without becoming faint when stamped continuously at 10-second intervals. The print size of the used stamp unit 1 was 35 mm×80 mm. The stencil paper 6 provided to the stamp unit 1 was perforated with a print face perforation rate of 20%.

(4) Lower left—stamping load under temperature of 10° C. (Unit: kg)

The stamping load was defined as the load applied on the single print face 4 of the stamp unit 1 during stamping. The size of the print face 4 was 35 mm×80 mm.

(5) Lower right—ink displacement (Unit: number of times)

The ink displacement was defined as the above-defined stamping durability obtained after the pad 5 was placed vertically and stored for one month at 35° C. The size of the pad was 15 mm×80 mm.

TABLE 1

| VISCOSITY | T. I. | | | | | | | | | |
|---|---|---|---|---|---|---|---|---|---|---|
| (P) (20/sec) | 1.1 (~1.2) | | 1.7 (1.2–2.0) | | 2.2 (2.0–2.5) | | 2.7 (2.5–3.0) | | 3.3 (3.0–) | |
| 15 (~20) | X○ 6 | 800 300 | X○ 6 | 800 1000 | X○ 6 | 1000 1000 | X○ 6 | 1000 1000 | X X 6 | 1000 1000 |
| 40 (20–50) | ○○ 7 | 1200 300 | ○○ 7 | 1200 1000 | ○○ 7 | 1200 1000 | ○○ 7 | 1200 1000 | ○X 7 | 1000 1000 |
| 70 (50–80) | ○○ 7 | 1200 400 | ○○ 7 | 1200 1000 | ○○ 7 | 1200 1000 | ○○ 7 | 1200 1000 | ○X 7 | 1000 1000 |
| 120 (80–150) | ○○ 7 | 1200 500 | ○○ 7 | 1400 1300 | ○○ 7 | 1400 1300 | ○○ 7 | 1200 1000 | ○X 8 | 800 1000 |
| 170 (150–200) | ○○ 7 | 1200 500 | ○○ 7 | 1200 1000 | ○○ 7 | 1200 1000 | ○○ 7 | 1200 1000 | ○X 8 | 800 1000 |
| 220 (200–250) | ○Δ 8 | 1200 500 | ○Δ 8 | 1200 1000 | ○Δ 8 | 1200 1000 | ○Δ 8 | 1200 1000 | ○X 9 | 800 1000 |
| 320 (250–) | INK WAS UNABLE TO BE PREPARED | | ○X 9 | 1000 1000 | ○X 10 | 1000 1000 | ○X 10 | 800 800 | ○X 10 | 800 800 |

TABLE 2

| VISCOSITY | PAD DENSITY (kg/m³) | | | | | | | | | | | | | |
|---|---|---|---|---|---|---|---|---|---|---|---|---|---|---|
| (P) (20/sec) | 15 (~20) | | 40 (20–50) | | 70 (50–80) | | 120 (80–150) | | 180 (150–200) | | 250 (200–30)) | | 350 (300–) | |
| 15 (~20) | X○ 3 | 250 — | X○ 4 | 650 — | X○ 6 | 800 — | X○ 6 | 800 — | X○ 6 | 800 — | X○ 8 | 650 — | X○ 10 | 250 — |
| 40 (20–50) | X○ 3 | 250 — | Δ○ 5 | 850 — | ○○ 7 | 1200 — | ○○ 7 | 1200 — | ○○ 7 | 1200 — | ○○ 8 | 850 — | ○○ 10 | 250 — |
| 70 (50–80) | ΔΔ 4 | 350 — | ○○ 5 | 850 — | ○○ 7 | 1200 — | ○○ 7 | 1200 — | ○○ 7 | 1200 — | ○○ 9 | 850 — | ○○ 10 | 250 — |
| 120 (80–50) | ΔΔ 4 | 350 — | ○○ 5 | 850 — | ○○ 7 | 1400 — | ○○ 7 | 1400 — | ○○ 7 | 1400 — | ○○ 9 | 750 — | ○○ 10 | 250 — |
| 220 (200–250) | ○Δ 4 | 350 — | ○Δ 6 | 850 — | ○Δ 8 | 1200 — | ○Δ 8 | 1200 — | ○X 9 | 1200 — | ○Δ 9 | 750 — | ○○ 11 | 250 — |
| 320 (250– ) | ○X 5 | 350 — | ○X 9 | 850 — | ○X 10 | 1200 — | ○X 10 | 1000 — | ○X 10 | 800 — | ○X 10 | 650 — | ○X 12 | 250 — |

TABLE 3

| T. I. | PAD DENSITY (kg/m³) | | | | | | | | | | | | | |
|---|---|---|---|---|---|---|---|---|---|---|---|---|---|---|
| | 15 (~20) | | 40 (20~50) | | 70 (50~80) | | 120 (80~150) | | 180 (150~200) | | 250 (200~30)) | | 350 (300~) | |
| 1.1 | ΔO | 350 | O O | 850 | O O | 1200 | O O | 1200 | O O | 1200 | O O | 750 | O O | 250 |
| ( ~1.2) | 4 | 50 | 5 | 200 | 7 | 500 | 7 | 500 | 8 | 500 | 9 | 700 | 0 | 250 |
| 1.7 | ΔO | 350 | O O | 850 | O O | 1400 | O O | 1400 | O O | 1400 | O O | 850 | O O | 250 |
| (1.2~2.0) | 4 | 50 | 5 | 850 | 7 | 1300 | 7 | 1300 | 8 | 1300 | 9 | 850 | 0 | 250 |
| 2.2 | ΔO | 350 | O O | 850 | O O | 1400 | O O | 1400 | O O | 1400 | O O | 850 | O O | 250 |
| (2.0~2.5) | 4 | 150 | 5 | 850 | 7 | 1300 | 7 | 1300 | 8 | 1300 | 9 | 850 | 0 | 250 |
| 2.7 | ΔO | 350 | O O | 850 | O O | 1200 | O O | 1200 | O O | 1200 | O O | 850 | O O | 250 |
| (2.5~3.0) | 4 | 250 | 5 | 850 | 7 | 1000 | 7 | 1000 | 8 | 1000 | 9 | 850 | 0 | 250 |
| 3.3 | ΔX | 350 | OX | 850 | OX | 1200 | OX | 1200 | OX | 1200 | OX | 850 | OX | 250 |
| (3.0~ ) | 5 | 350 | 7 | 850 | 8 | 1000 | 8 | 1000 | 9 | 1000 | 11 | 850 | 13 | 250 |

As described above, Table 1 shows the print results when the pad density was fixed at 120 kg/m³ and the T.I. and the viscosity of the inks were varied. The stamp ink with a viscosity of 320 poises and a T.I. of 1.1 was unable to be prepared. A T.I. of 1.1 results in stamp ink displacement, while a T.I. of 3.3 results in slow setting and inferior drying. Further, a viscosity of 15 poises results in blurring, while a viscosity of 320 poises results in inferior drying. The most satisfactory results over all of the evaluation categories occurred at a T.I. of 1.7 and 2.2 and a viscosity of 120 poises.

Table 2 shows the print results when the T.I. was fixed at 1.7 and the pad density and viscosity were varied. Table 3 shows the print results when the viscosity was fixed at 120 poises and the pad density and the T.I. were varied. It is clear that stamping durability extremely suffers at the pad density of 15 kg/m³ and 350 kg/m³. The most satisfactory results over all of the evaluation categories occurred at a pad density of 70 120, and 180 kg/m³.

As described above, according to the viscosity characteristics of the stamp ink and the pad density of the impregnation pad for stencil printing, the stamp ink does not displace to collect in a lower portion of the pad through the gravitational force, makes no blurring, sets quickly, making possible the producing of prints with a high print density and permitting even longer continuous printing.

While the invention has been described in detail with reference to the specific embodiment thereof, it would be apparent to those skilled in the art that various changes and modifications may be made therein without departing from the spirit of the invention.

What is claimed is:

1. A stamp ink for stencil printing, comprising a coloring-agent mixed in a vehicle made from resin and oil-based solvent, wherein the stamp ink has a viscosity in the range of from 20 to 250 posies at a shear rate of 20/sec at a temperature of 25° C., and has a thixotropy index T.I. in the range of from 1.2 to 3.0 at a temperature of 25° C., wherein the thixotropy index T.I. is defined in the expression of: T.I.=(Viscosity at a shear rate of 0.5/sec)/(Viscosity at a shear rate of 5.0/sec).

2. A stamp ink for stencil printing as claimed in claim 1, wherein the stamp ink is made from the coloring-agent, the resin, and the oil-based solvent with their amounts allowing the stamp ink to develop the viscosity in the range from 20 to 250 poises at the shear rate of 20/sec and to develop the thixotropy index T.I. in the range from 1.2 to 3.0.

3. A stamp ink for stencil printing as claimed in claim 2, wherein the stamp ink is made by adding the coloring-agent to the resin and the oil-based solvents to form a mixture breaking down and dispersing the mixture, and then adding, to the mixture, amounts of the resin and the oil-based solvents that allow the stamp ink to develop the viscosity in the range from 20 to 250 poises at the shear rate of 20/sec and to develop the thixotropy index T.I. in the range from 1.2 to 3.0.

4. A stamp ink for stencil printing as claimed in claim 1, wherein the stamp ink further includes a thixotropic agent.

5. A stamp ink for stencil printing as claimed in claim 4, wherein the stamp ink is made from the coloring-agent, the resin, the oil-based solvent, and the thixotropic agent with the amount of the thixotropic agent allowing the stamp ink to develop the viscosity in the range from 20 to 250 poises at the shear rate of 20/sec and to develop the thixotropy index T.I. in the range from 1.2 to 3.0.

6. A stamp ink for stencil printing as claimed in claim 4, wherein the thixotropic agent comprises a material selected from the group consisting of aluminum stearate, aluminum octylate, aluminum oleate, aluminum naphthenate, ethyl acetoacetate aluminum diisopropylate, alkyl acetoacetate aluminum diisopropylate, higher fatty acid amides, extender pigments, silica gel, and class four ammonium salts of montmorillonite.

7. A stamp ink for stencil printing as claimed in claim 6, wherein the extender pigments are selected from the group consisting of talc, kaolin, calcium carbonate, and barium sulfate.

8. A stamp ink for stencil printing as claimed in claim 1, wherein the stamp ink has the viscosity in a range from 50 to 200 poises at the shear rate of 20/sec and has the thixotropy index in the range from 1.2 to 2.5.

9. A stamp ink for stencil printing as claimed in claim 8, wherein the stamp ink has the viscosity in the range from 80 to 150 poises at the shear rate of 20/sec and has the thixotropy index in the range from 1.2 to 2.0.

10. A stamp ink for stencil printing as claimed in claim 1, wherein the coloring-agent is a pigment.

11. A stamp ink for stencil printing as claimed in claim 1, wherein the coloring-agent comprises a material selected from the group consisting of carbon black, red iron oxide, ochre, ultramarine blue, Prussian blue, insoluble azo dye, soluble azo dye, phthalocyanine, quinacridone, and oil-soluble dyes.

12. A stamp ink for stencil printing as claimed in claim 1, wherein the resin comprises a material selected from the group consisting of rosin, rosin ester, rosin-modified phenol resin, alkyd resin, petroleum resin, and rosin-modified maleic resin.

13. A stamp ink for stencil printing as claimed in claim 1, wherein the oil-based solvents have a low volatility.

14. A stamp ink for stencil printing as claimed in claim 1, wherein the oil-based solvents comprises a material selected from the group consisting of hydrocarbon solvents with a boiling point of 300° C. or higher, petroleum solvents, synthetic oils obtained through polymerization of unsaturated hydrocarbons, and animal and vegetable oils.

15. A stamp ink for stencil printing as claimed in claim 14, wherein the petroleum solvents are selected from the group consisting of spindle oil, liquid paraffin, motor oil, gear oil, and machine oil, wherein the synthetic oils are obtained through polymerization of one of ethylene, propylene, and butene, and wherein the animal and vegetable oils are selected from the group consisting of castor oil, tall oil, soybean oil, olive oil, and whale oil.

* * * * *